Patented Nov. 7, 1939

2,179,038

UNITED STATES PATENT OFFICE 2,179,038

TANNING AGENTS AND PROCESS OF PRODUCING THEM

Friedrich Wilhelm Guthke, Ludwigshafen-on-the-Rhine, Germany, assignor to I. G. Farbenindustrie Aktiengesellschaft, Frankfort-on-the-Main, Germany No Drawing. Application July 1, 1937, Serial No. 151,453. In Germany July 8, 1936

4 Claims. (Cl. 260—49)

The present invention relates to new tanning agents and a process for producing same.

I have found that especially valuable tanning agents are obtained when the water-soluble sulphonated products obtained by the condensation of phenols or naphthols or their sulphonic acids with a formaldehyde substance (i. e. formaldehyde itself or a substance yielding formaldehyde), and if necessary treatment with sulphonating agents, are aftertreated with phenols or naphthols and a formaldehyde substance. The condensation products of phenols and formaldehyde are in this way dispersed in the said water-soluble products so that products which are soluble or colloidally soluble in water are obtained.

The condensation products containing sulphonic groups and obtained from phenols and formaldehyde may be prepared in any desired manner; for example the phenols or the like may first be wholly or partially sulphonated and then condensed with the formaldehyde. To these products there is then advantageously added the phenol after which formaldehyde is allowed to act on the mixture, tanning agents being formed which yield considerably fuller leather than the products which have not been aftertreated in the same manner.

Depending on the nature and amount of the substances used and on the conditions, tanning agents can be obtained which yield firmer or softer leather. The new tanning agents have the advantage that they can be adjusted more weakly acid than those which have not been aftertreated in the said manner. They may be co-employed in comparatively large amounts in vegetable tanning. The proportion of tanning to non-tanning constituents is also favorable.

The after-treatment may be carried out at different degrees of acidity. For example products prepared according to the British Patent No. 8511/1912 may be directly treated with phenol and formaldehyde or neutralized partially with caustic soda solution, ammonia, magnesium oxide or organic bases before, during or after the addition of the said two substances. The condensation may also be carried out in a neutral or alkaline medium.

The treatment with phenol and formaldehyde may be effected at comparatively low temperatures, as for example from 20° to 40° C.

The amount of phenol or the like and of formaldehyde to be used and the proportions of these substances to each other may be varied within wide limits. Only such an amount is used, however, that no appreciable amounts of insoluble constituents separate. As the phenolic component both for the preparation of the reaction product with formaldehyde and sulphonating agents and also for the after-treatment, there may be mentioned pure phenols and cresols and mixtures of the same, naphthols and crude phenols such as are obtained in the low temperature carbonization or hydrogenation of brown coals. The formaldehyde may be used in any form and substances which split off formaldehyde may also be used.

Especially valuable tanning agents can be obtained by causing an action of urea and formaldehyde to take place at a suitable stage of the process. This is preferably effected before the after-treatment with phenols and formaldehyde, but may also be carried out simultaneously with or after the same. If the action of urea and formaldehyde be carried out in a stage in which the reaction mixture is in any case acid, it is advantageous to carry it out in an acid medium; it may, however, also take place in an alkaline medium.

The tanning agents thus obtainable are distinguished by especially pronounced plumping action and yield leather of specially pale color and excellent fastness to light.

The following examples will further illustrate how the said invention may be carried out in practice but the invention is not restricted to these examples. The parts are by weight.

Example 1

450 parts of cresol are sulphonated at 100° C. with 450 parts of concentrated sulphuric acid. The sulphonation product is condensed with 210 parts of 30 per cent formaldehyde and neutralized with ammonia or caustic soda solution to such an extent that 10 grams of the reaction mixture require from 10 to 11 cubic centimeters of normal caustic soda solution. 108 parts of cresol are then added and then, at from 30° to 35° C., 50 parts of 30 per cent formaldehyde are gradually added and the mixture stirred until the formaldehyde has been used up.

A tanning agent is thus obtained which yields a considerably fuller leather than the untreated product.

Example 2

225 parts of cresol are incompletely sulphonated with 143 parts of oleum containing 60 per cent of $SO_3$ and, after dilution with 32 parts of water, condensed with 105 parts of 30 per cent formaldehyde. The resulting water-soluble product is treated with 45 parts of cresol and 21 parts of formaldehyde in the manner described in Example 1 and then adjusted with magnesium formate, ammonium formate or sodium acetate until the pH-value of a 10 per cent solution is about 3.

The resulting tanning agent yields leather of very good fullness.

*Example 3*

450 parts of an industrial mixture of phenol, cresol and xylenols formed by the hydrogenation of brown coals is sulphonated and condensed with formaldehyde in the manner described for cresol in Example 1.

The condensation product has added to it 54 parts of the same phenol mixture and 25 parts of formaldehyde and the whole is stirred until the formaldehyde has been used up. The mixture is adjusted with ammonium formate or ammonia and formic acid so that a 10 per cent solution has a pH-value of about 3.

*Example 4*

450 parts of cresol are sulphonated in the manner described in Example 1 and condensed with formaldehyde. To the resulting product there is added a solution of 120 parts of urea in 120 parts of water and it is condensed at from 35° to 40° C. with a further 200 parts of formaldehyde; the product is neutralized with ammonia to such an extent that 10 grams of the reaction mixture require from 11 to 12 cubic centimeters of normal caustic soda solution. 216 parts of cresol are then added and then, at from 30° to 35° C., 100 parts of 30 per cent formaldehyde are slowly added and the mixture stirred until the formaldehyde has been used up.

The tanning agent obtained may be adjusted with ammonium formate, magnesium formate or sodium acetate so that the pH-value of its 10 per cent solution is about 3.

Instead of cresol, the mixture of phenol, cresol and xylenols specified in Example 3 may be used.

*Example 5*

450 parts of a mixture of phenol, cresol and xylenols obtained in the hydrogenation of brown coal are sulphonated and condensed with formaldehyde in the manner described in Example 1.

The condensation product is rendered alkaline with ammonia or caustic soda solution and mixed with 108 parts of the above mentioned mixture of phenol, cresol and xylenols; the whole is treated at from 30° to 35° C. with 50 parts of 30 per cent formaldehyde. After adding 120 parts of urea dissolved in 120 parts of water the mass is treated at the said temperature with a further 200 parts of 30 per cent formaldehyde. The mass is heated to 100° C. until the formaldehyde is completely used up.

The product obtained remains in the dissolved state after adjusting the acidity to the pH-value 3 with acetic acid anhydride; it may be employed with advantage for tanning hides.

Instead of proceeding as described above after rendering alkaline the condensation product there may be first carried out the treatment with urea-formaldehyde and then with phenol-formaldehyde, a tanning agent of similar properties thus being obtained.

What I claim is:

1. The process for the production of tanning agents, which comprises subjecting a water-soluble sulphonated condensation product derived from a hydroxy compound selected from the class consisting of the phenols and naphthols and a formaldehyde substance, to an after-treatment with a formaldehyde substance and a hydroxy compound selected from the class consisting of the phenols and naphthols, and causing an action of urea and a formaldehyde substance to take place at a suitable stage of the process.

2. The process for the production of tanning agents, which comprises causing urea and a formaldehyde substance to act on a water-soluble sulphonated condensation product derived from a hydroxy compound selected from the class consisting of the phenols and naphthols and a formaldehyde substance, and subjecting the product obtained to an after-treatment with a formaldehyde substance and a hydroxy compound selected from the class consisting of the phenols and naphthols.

3. Tanning agents obtainable according to the process claimed in claim 1.

4. Tanning agents obtainable according to the process claimed in claim 2.

FRIEDRICH WILHELM GUTHKE.